US006240407B1

(12) United States Patent
Chang et al.

(10) Patent No.: US 6,240,407 B1
(45) Date of Patent: May 29, 2001

(54) METHOD AND APPARATUS FOR CREATING AN INDEX IN A DATABASE SYSTEM

(75) Inventors: Daniel T. Chang; Josephine Miu-Kung Cheng; Jyh-Herng Chow; Jian Xu, all of San Jose, CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/215,036

(22) Filed: Dec. 17, 1998

Related U.S. Application Data (60) Provisional application No. 60/083,430, filed on Apr. 29, 1998.

(51) Int. Cl.[7] .................................................. G06F 17/30
(52) U.S. Cl. ..................... 707/2; 1/3; 1/5; 1/10; 1/101; 1/102; 1/103
(58) Field of Search ................................ 707/1, 2, 3, 5, 707/101, 102, 103, 10; 709/225; 717/1; 714/4

(56) References Cited

U.S. PATENT DOCUMENTS

| | | | |
|---|---|---|---|
| 3,947,825 | 3/1976 | Cassada | 707/3 |
| 4,358,824 | 11/1982 | Glickman et al. | 707/5 |
| 5,056,021 | 10/1991 | Ausborn | 704/9 |
| 5,159,647 | 10/1992 | Burt | 382/103 |
| 5,721,897 | 2/1998 | Rubinstein | 707/2 |
| 5,893,104 | * 4/1999 | Srinivasan et al. | 707/102 |
| 6,128,610 | * 10/2000 | Srinivasan et al. | 707/3 |

FOREIGN PATENT DOCUMENTS

| | | |
|---|---|---|
| 1 110 814 | 4/1994 | (CN) . |
| 609 996 | 1/1994 | (EP) . |
| 09 034 906 | 7/1995 | (JP) . |

OTHER PUBLICATIONS

Wu et al. "Multi View intermediate representation based on algebraic data type" (IEEE publication) paper from High performance computing in asia–pacific 2000, pp. 263–264, vol., May 2000.*

Bouhoula, A. "Simultaneous checking of completeness and ground confluence" (IEEE publication) paper in Automated software engineering, 2000, pp. 143–151, Sep. 2000.*

IBM Technical Disclosure Bulletin, vol. 40, No. 10, Oct., 1997, "Export in Self–Defining Archive–Compatible Format From Remote Image Capture."

Jason McHugh et al., "Lore: A Database Management System for Semistructured Data," Stanford University; dated unknown.

Mariano P. Consens et al., "Optimizing Queries on Files," Proceedings of the 1994 ACM SIGMOD Conference.

L.J. Brown et al., "A Structured Text ADT for Object–Relational Databses," University of Waterloo, Waterloo, Ontario, Canada, Jul. 1997.

Peter Buneman et al., "A Query Language and Optimization Techniques for Unstructured Data," Montreal, Canada, SIGMOD '96, Jun., 1996.

Kwagnkeun Yi et al., "Automatic Generation Management of Interprocedural Program Analyses," The Twentieth Annual ACM Symposium on Pfinciples of Programming Languages, Jan., 1993.

(List continued on next page.)

Primary Examiner—Thomas Black
Assistant Examiner—Diane Mizrahi (57) ABSTRACT

A method, apparatus and article of manufacture for computer-implemented creation of an index in a database system is defined, wherein a structured document, interactively entered by an operator or already stored in the database system, is parsed into at least one corresponding element, then abstracted using a predefined abstraction procedure to obtain a set of abstracted values, the set of abstracted values being stored in the index for efficient execution of structured queries.

66 Claims, 8 Drawing Sheets

OTHER PUBLICATIONS

Tim Bray et al. (Ed.), "Extensible Markup Language (SML) 1.0", W3C Recommendations 10–Feb.–1998.

Ke Wang et al., "Schema Discovery for Semistructured Data," National University of Singapore, American Association for Artificial Intelligence, 1997, pp. 271–274.

Elisa Bertino et al., "Indexing Techniques for Queries on Nested Objects," *IEEE Transactions on Knowledge and Data Engineering*, vol. 1, No. 2, Jun., 1989.

Partick Cousot et al., "Abstract Interpretation: A Unified Lattice Model for Static Analysis of Programs by Construction or Approximation of Fixpoints," 1977, pp. 238–252.

Roy Goldman et al., "DataGuides: Enabling Query Formulation and Optimization in Semistructured Databases," Proceedings of the 23rd VLDB Conference, Athens, Greece, 1997.

Jason McHugh et al., "Indexing Semistructured Data," Stanford, CA 21 pp.; date unknown.

Mary Fernandez et al., "Optimizing Regular Path Expressions Using Graph Schemas," AT&T Labs, Florham Park, NJ; dated unknown.

Tova Milo et al., "Index Structures for path Expressions," Tel Aviv University, AT&T Labs, 18 pp.; date unknown.

* cited by examiner

```xml
<?xml version="1.0"?>
<! DOCTYPE book SYSTEM "bk.dtd" >
<book>
    <author> Sriram Srinivasan </author>
    <title> Advanced Perl Programming </title>
    <publisher> O'Reilly </publisher>
    <date> August, 1997 </date>
    <edition> First </edition>
    <abstract> This is a very good Perl book. </abstract>
    <toc>
        <chapter id="1" total="8"> Data Reference and Anonymous Storage
            <section> Referring to Existing Variables </section>
            <section> Using References </section>
            <section> Nested Data Structure </section>
            <section> Querying a Reference </section>
        </chapter>
        <chapter id="2" total="6"> Implementing Complex Data Structures
            <section> User-Defined Structures </section>
            <section> Example: Matrices </section>
            <section> Professors, Students, Courses </section>
        </chapter>
        <appendix>
            <section id="A"> The Widget References </section>
            <section id="B"> Syntex Summary </section>
        </appendix>
    </toc>
</book>
```

FIGURE 3

$D_1$:complete document

$D_2$:merge children with the same tag

$D_3$:merge some children into a single one with a new tag $D_4$:collapse a subtree into a single node $D_5$: remove some children $D_6$: collapse the whole document

```
// e: a node in I
// path: the path to search
// pos: position in path to match (0 .. path.length-1)
// Output: the set of nodes that matches the path // try matching e with path(pos) in the index
searchI(e,path,pos) {
  result = null;
  if (e == path(pos)) { // match e with the current position
     if (pos < path.length) { // more position to match
         for (each child of e)
             result = result + searchI(e.child, path, pos+1);
         if (e is marked && searchS(e, path, pos)) {
             // e has non-path preserving abstraction
             // and we find a match in the removed structure
             result = result + e;
         }
     } else result = e;
  } else { // not match,
    // try search e in decendant
    for (each child of e)
        result = result + searchI(e.child, path, pos);
    // also try in the removed structure
    if (e is marked && searchS(e, path, pos))
        result = result + e;
  }
  return result;
}

// try matching e with path(pos) in its removed structure S.
// return true if the path starting from pos is found in S
searchS(e,path,pos) {
  S = the removed structure at e;
  if (e == path(pos)) { // match e with the current position
     if (pos < path.length) { // more position to match
         for (each child of e) {
             // return true once find a full match
             if (searchS(e.child, path, pos+1)) return true;
         }
     } else return true;
  } else return false;
}
```

METHOD AND APPARATUS FOR CREATING AN INDEX IN A DATABASE SYSTEM

CROSS REFERENCE TO PROVISIONAL APPLICATION

This application claims priority from U.S. Provisional Application No. 60/083,430, entitled, "Index Design For Structured Documents Based on Abstraction," filed on Apr. 29, 1998, by Chang et al., attorney's reference number ST9-98-037, which is incorporated by reference herein.

BACKGROUND OF THE INVENTION

1. Field of the Invention

This invention relates in general to computer-implemented database systems, and, in particular, to a method and apparatus for creating an index in a database system for efficient execution of structured queries.

2. Description of the Related Art

HyperText Markup Language (HTML) has been the standard format for delivering information on the World Wide Web (WWW). However, HTML has only a limited set of tags for specifying document structures, and these tags are mainly for the purposes of browser presentation. Automated information processing on these documents for data exchange and interoperability has been difficult. Extensible Markup Language (XML), which is a subset of Standard Generalized Markup Language (SGML), has been proposed to be the next standard format that allows user-defined tags for better describing nested document structures and associated semantics.

People are still learning how to use effectively the flood of information available on the Internet and intranets. Thanks to current search engines, queries may yield very extensive results that may contain the needed information from sites all over the world. There are several main functions in a search engine: information gathering, indexing, categorization, and searching. Information gathering usually uses Web crawlers to send visited pages to the index engine. The index mechanism normally uses some form of inverted files and, when given a word, returns a list of references that contain the word. Categorization, or clustering, tries to categorize the pages according to some attributes, such as topics. The searching function allows the user to ask content-based queries and get ranked result sets.

While HTML documents serve very well for Web browsing, automated information processing on them could be difficult, because there are few semantics associated with the documents. For example, without human understanding or a sophisticated program, it is difficult to know what a number "1991" means in an HTML document; it could be a year, a quantity, or anything. Just as in a programming language, program semantics are defined by a standardized set of keywords. HTML has a limited set of keywords (i.e., tags) and they are mainly for presentation purposes, not for semantics associated with document contents.

To be able to automate Web information processing and in particular for data exchange and interoperability, XML has been proposed to the World Wide Web Consortium (W3C) as a new markup language that supports user-defined tags, and encourages the separation of document contents from presentation. XML is a meta language that allows the user to define a language for composing structured documents. With XML, the user can define any desired tags for better structuring of documents (although adding misleading tags is also possible). For interoperability, domain-specific tags, called vocabulary, can be standardized, so that applications in that domain understand the meaning of the tags. Various vocabularies for different domains have been proposed in the SGML community, such as Electronic Data Interchange (EDI) for banking exchange, Standard Music Description Language (SMDL) for music, or Chemical Markup Language (CML) for chemical. Recently, vocabularies have been proposed in the XML community, for example the Channel Definition Format (CDF) for channel.

Structured documents refer to documents that can have nested structures. Assuming structured documents will be abundant, in particular within intranets and extranets (between businesses), where documents are more likely to be regularly structured, there is clearly a need for a search engine that understands document structures and allows a user to ask structured queries. Current search engines either flatten out the structure of a document (i.e., remove nested structures), or have limited, predefined structures (such as paragraphs and sentences, according to some predefined punctuation marks), and thus are not capable of evaluating general ad hoc structured queries. Structured documents also enable comparisons among numeric values, for example, to get the references published after year 1991 from a structured paper (which is not possible with an inverted file based search engine).

A successful search engine for a large repository of structured documents relies on good indexing schemes. Therefore, there is a need in the art for designing indexes that support structured queries and execute the queries without resorting to the structured documents.

SUMMARY OF THE INVENTION

To overcome the limitations in the prior art described above, and to solve various problems that will become apparent upon reading and understanding of the present specification, it is one object of the present invention to provide a method, apparatus and article of manufacture for computer-implemented creation of an index in a database system to provide efficient execution of structured queries.

In accordance with the present invention, a general framework is disclosed for manipulating structured documents based on document abstractions. This general framework is applied to the area of indexing and searching structured documents, but it is to be understood that it can be applied to other functions, such as document summarization or categorization.

In order to handle any structured query, an index created by the general framework must possess some form of document structures, sufficient to enable it to evaluate the query without resorting to document sources. To create the structured index, a structured document, interactively entered by an operator or already stored in the database system, is parsed into at least one corresponding element, then abstracted using a predefined abstraction procedure to obtain a set of abstracted values, the set of abstracted values being stored in the index for efficient execution of structured queries.

An object of the present invention is to apply the abstract interpretation technique to structured documents. This is accomplished through the process of abstracting the elements of a previously parsed document.

Another object of the invention is to provide a framework, based on document abstractions, that generalizes many existing techniques and provides a systematic approach to experimenting with the tradeoff between cost and capability for application on structured documents.

Yet another object of the invention is to apply the framework to the functions of indexing and searching structured documents, and to describe the design space in structural and content abstractions.

BRIEF DESCRIPTION OF THE DRAWINGS

The above objects and advantages of the present invention will become more apparent by describing in detail preferred embodiments thereof with reference to the attached drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and which show by way of illustration a specific embodiment of the invention. It is to be understood by those of working skill in this technological field that other embodiments may be utilized, and structural changes may be made without departing from the scope of the present invention.

Figure 1:
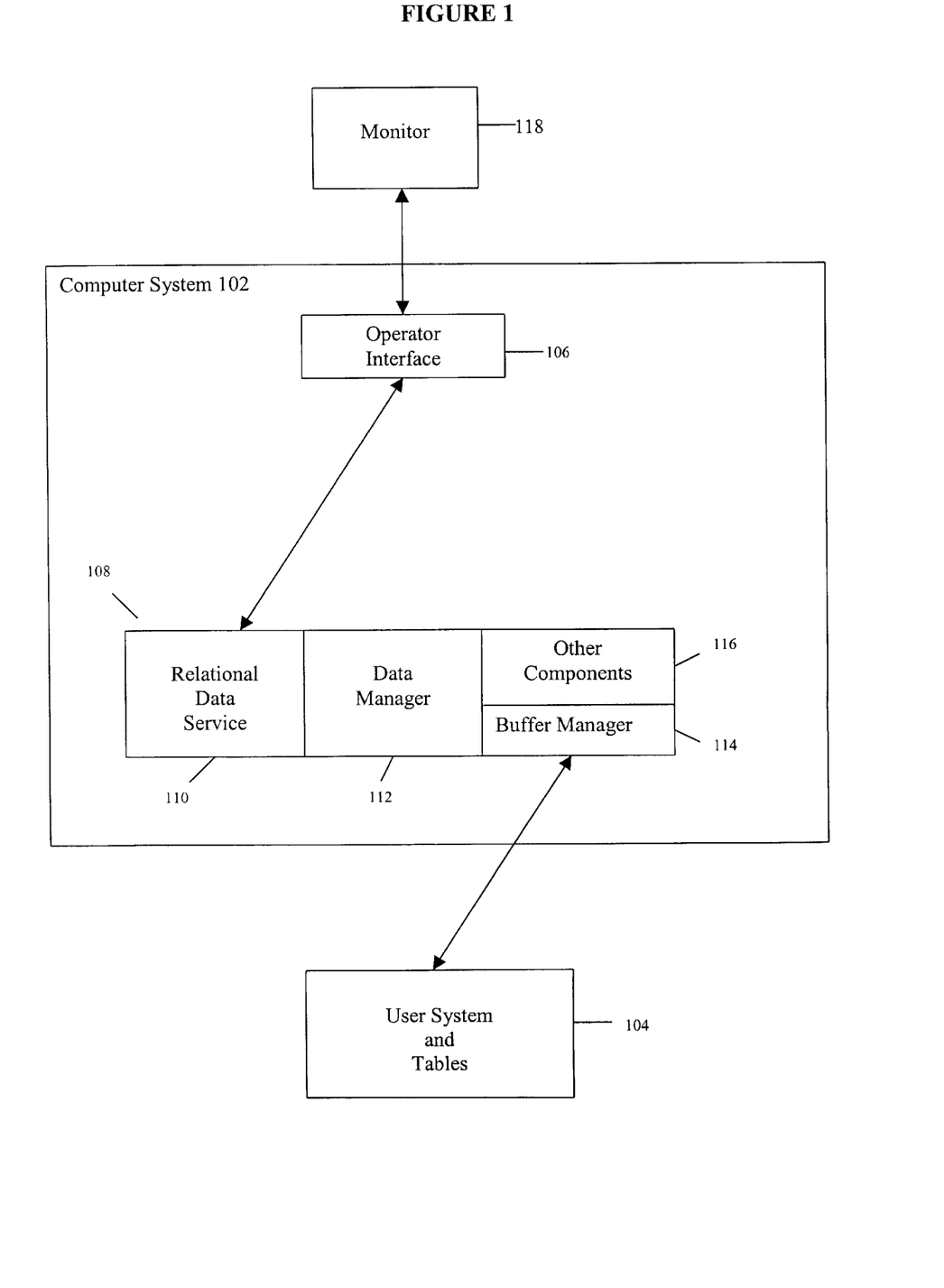
FIG. 1 illustrates an exemplary computer hardware environment for use in accordance with the present invention.

FIG. 1 illustrates an exemplary computer hardware environment for use with the present invention. In FIG. 1, a computer system 102 has one or more processors connected to one or more data storage devices 104 that store one or more relational databases. Each data storage device 104 may be any of a plurality of types, all of which are well known in the art, including but not limited to magnetic, optical, magneto-optical, or semiconductor memory.

Operators of the computer system 102 may use a standard operator interface 106, such as IMS/DB/DC®, CICS®, TSO®, OS/390®, ODBC® or other appropriate interface, to transmit electrical signals to and from the computer system 102, representing commands for performing various search and retrieval functions, termed queries, against the databases. In the present invention, these queries employ Structured Query Language (SQL), and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM Corporation (IBM) for the MVS® or OS/390® operating systems and the DB2 Universal Database (UDB) offered by IBM for workstations. Those skilled in the art will recognize, however, that the present invention has application to any RDBMS software, whether or not the RDBMS software uses SQL.

At the center of the DB2® system is Database Services module 108. The Database Services module 108 contains several submodules, including a Relational Data Service (RDS) 110, a Data Manager 112, a Buffer Manager 114, and other components 116 such as an SQL compiler/interpreter. These submodules support the functions of the SQL language, i.e. definition, access control, interpretation, compilation, database retrieval, and update of user and system data.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The present invention will now be described in further detail. As illustrated in FIG. 1, the data storage devices 104 store the relational databases, as well as indexes used by search engines to answer queries. The present invention provides a general framework for manipulating structured documents based on document abstractions, especially in the areas of indexing and searching. This general framework is applied to the XML domain, but those skilled in the art will understand that the general framework is also applicable to general structured documents.

Using XML terminology, a structured document is composed of elements, identified by nested tags. The structured document also includes a unique root element. The content of an element is defined to be the text between a start-tag and an end-tag of the element. In general, the content of an element may include some mixed nested elements and some pure text (or CDATA for "character data" in XML terminology). Furthermore, an element of the structured document may also include attributes, in the form of name= value pairs.

An XML document may be well-formed or valid. In a well-formed document, each element has a matching pair of a start-tag and an end-tag. A valid document is a well-formed document that can be verified with respect to a document type declaration (DTD), which is an extension specifying what can appear as tags within given element contents. The present invention requires XML documents to be well-formed, but not necessarily valid, although it is to be understood that valid documents may be used as well.

Figure 2:
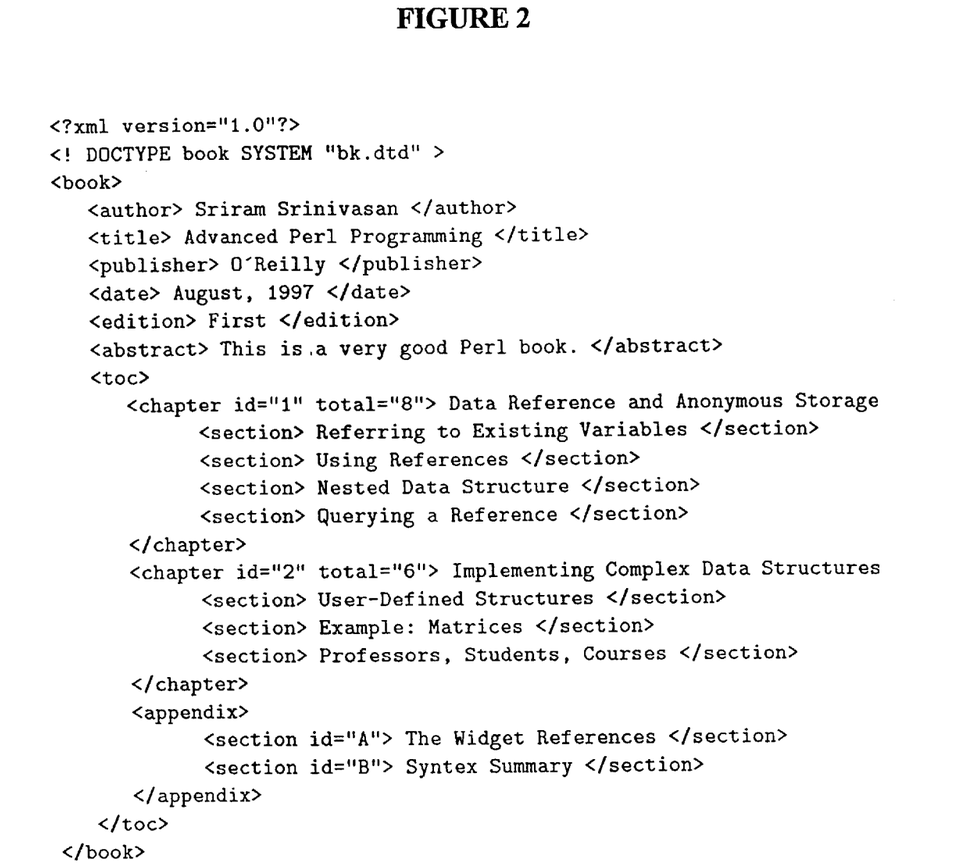
FIG. 2 illustrates an example of an XML document.

Referring to FIG. 2, an example of a well-formed XML document is shown, wherein each element of the XML document starts with a start-tag and ends with an end-tag. This XML document could also be a valid document if it conforms to the "bk.dtd" document type declaration. In XML documents, <?xml . . . > is called prolog, and <!DOCTYPE . . . > is used to indicate a document type declaration (DTD). In the XML document shown in FIG. 2, the content of the <date> element is "August, 1997", while both <chapter> elements have two attributes, "id" and "total", and the content of the <chapter> elements further includes nested <section> elements.

The syntactic structure of a structured document can be thought of as a tree, where each node denotes an element in the document, and an edge denotes the parent-child relationship. This type of syntactic structure is hereinafter referred to as the document structure. Normally, "content" is used to refer to pure text content, and usually the content nodes and attributes are omitted if the only interest is in the structure of a document. For example, the XML document shown in FIG. 1 has a document structure illustrated in FIG. 3. Since the description is not limited to valid documents, some book documents may have slightly different structures. For example, some book documents may have a <price> tag, may not have the <edition> tag, or may narrow the <author> tag into a <first name> tag and a <last name> tag.

Figure 3:
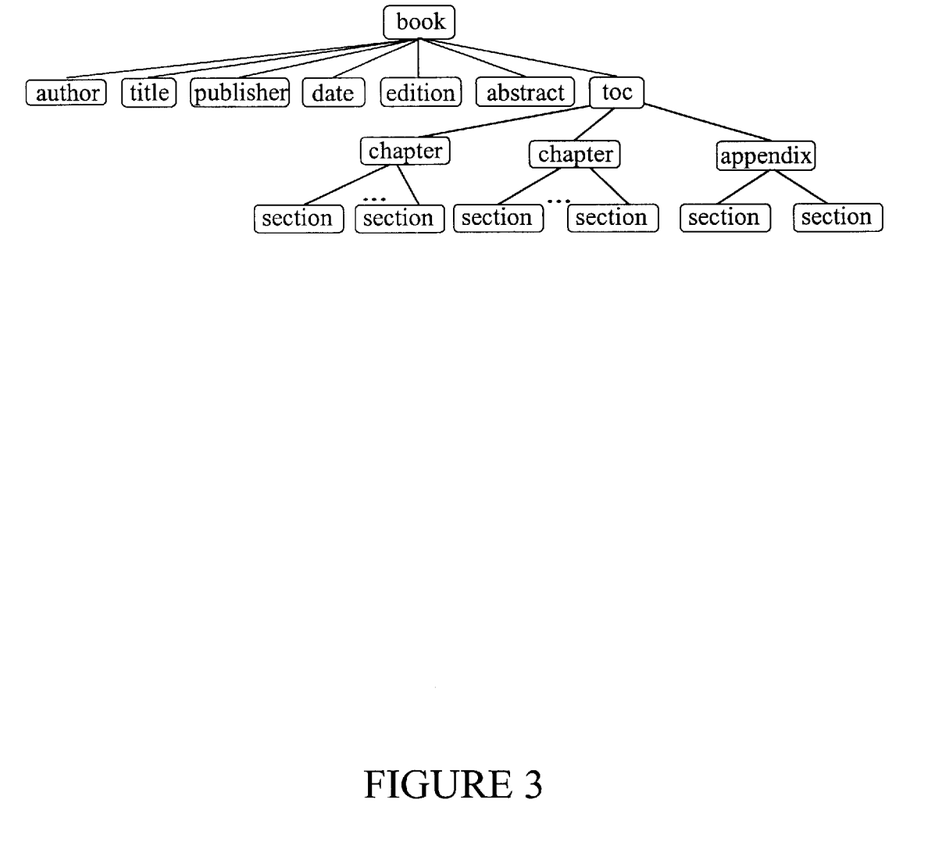
FIG. 3 illustrates an example of a structure of the XML document of FIG. 2, for use in the creation of an index.

Considering a collection of XML documents, it will be very natural for a user to formulate queries that specify structures as part of search criteria. In general, a structured search allows a user to specify a path expression to match a certain structure in the XML documents. As shown in FIG. 3, the path expression "chapter.section" refers to the elements with <section> tags within the elements with <chapter> tags, thus excluding the elements with <section> tags within the elements with <appendix> tags. In addition, a path expression can also specify attributes associated with an element. For example, referring back to FIG. 2, the "chapter [id=1].section" path expression matches only the elements having <section> tags within the element having <chapter> tags with the attribute "id=1."

Therefore, in general, a path expression may be defined as follows. Assuming $e_1, \ldots, e_n$ are tag names, or * (wild card), and $a_{ij}$ are attribute names in $e_i$, a path expression $$e_1[a_{11}=v_{11}, \ldots, a_{\{m\_1\}}=v_{\{m\_1\}}] \ldots e_n[a_{n1}=v_{n1}, \ldots, a_{n\{m\_1\}}=v_{n\{m\_n\}}]$$

matches structures in the XML document having the specified tag sequence and the specified attribute values at each tag. The above definition uses "and" semantics and assumes that all attributes within a tag element must be satisfied. If necessary, other extensions may be used, such as '|' to allow "or" semantics among attributes or among tags, or general binary operations (e.g., "<").

In order to provide fast searching capabilities, text search engines use indexes to answer queries without reading the document sources. A content-search index is usually implemented by inverted files and which support fast content search for words that appear in the whole document, or specifically in certain pre-decided flat regions, such as 'title' regions or more complicated 'paragraph' regions. A structure-search index, as described in the present invention, allows querying of structured documents using path expressions. The structure-search index is capable of handling ad hoc path expressions entered by the user, not just a predefined set of paths. At the same time, the structure-search index may or may not have the capability to handle a content search.

Because the structure-search index must be able to handle any ad hoc path expression queries, the index possesses some form of document structures to allow evaluation of a path expression inside the index, without reading document sources. In one embodiment of the present invention, the structure of the index consists of structural abstractions of XML documents. An abstraction is an approximation of an actual XML document, while still possessing useful properties for analysis. Abstractions may be applied to contents of elements within the XML document, as well as to attributes associated with those elements.

Figure 4:
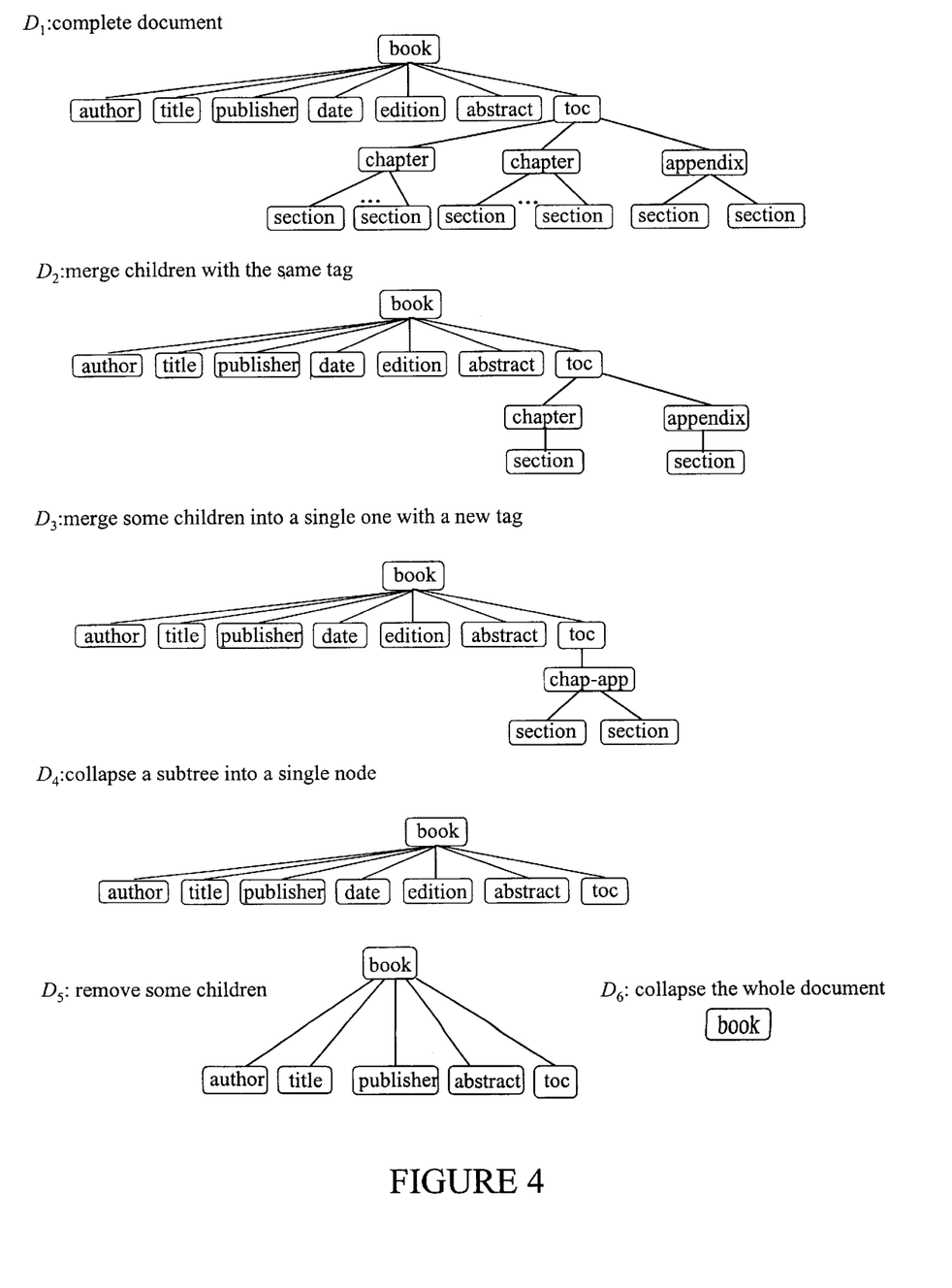
FIG. 4 illustrates examples of document abstractions using the structured document illustrated in FIG. 3.

A structured document may be abstracted in several ways. At one extreme, an abstraction may map a document into itself, and thus, an index based on this type of abstraction will essentially contain every complete document. At the other extreme, an abstraction may be defined to map every structured document into a totally unstructured document by removing all the nested elements. A structured index based on this latter type of abstraction will be very simple, but will only provide help filtering at the top level, and will require reading the source documents to complete a structured search. FIG. 4 illustrates some types of abstractions that may be used for the structured XML document shown in FIG. 2, and shows the resulting abstracted structures. Referring to FIG. 4, the abstractions are labeled:

$D_1$: maps the document into itself.

$D_2$: merges elements having the same tag (for example, the elements with the <toc>, <chapter>, and <appendix> tags).

$D_3$: merges some elements into a single element with a new tag (for example, merges the elements with <chapter> and <appendix> tags into a new element with <chap-app> tag).

$D_4$: collapses a subtree into a single node (for example, maps the element with the <toc> tag into a single node). For an index based on this type of abstraction, searching elements within the <toc> node may require reading document sources.

$D_5$: removes some elements (for example, if there is no interest in the elements with the <date> and <edition> tags).

$D_6$: collapses the whole document into a single node.

The type of abstraction determines the capability of the index and the cost in index maintenance. If the abstraction is more abstract, the index is smaller and, as a result, less capable to handle the query by itself. Therefore, the index may require reading of the whole document in order to complete the search and respond to the query. The fact that a user may define various abstractions provides flexibility in the design of the index and helps to find an abstraction that provides good searching capability with reasonable cost.

Figure 5:
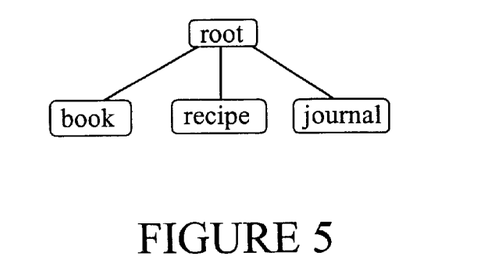
FIG. 5 illustrates an index created using a document abstraction labeled D6 in FIG. 4.
Figure 6:
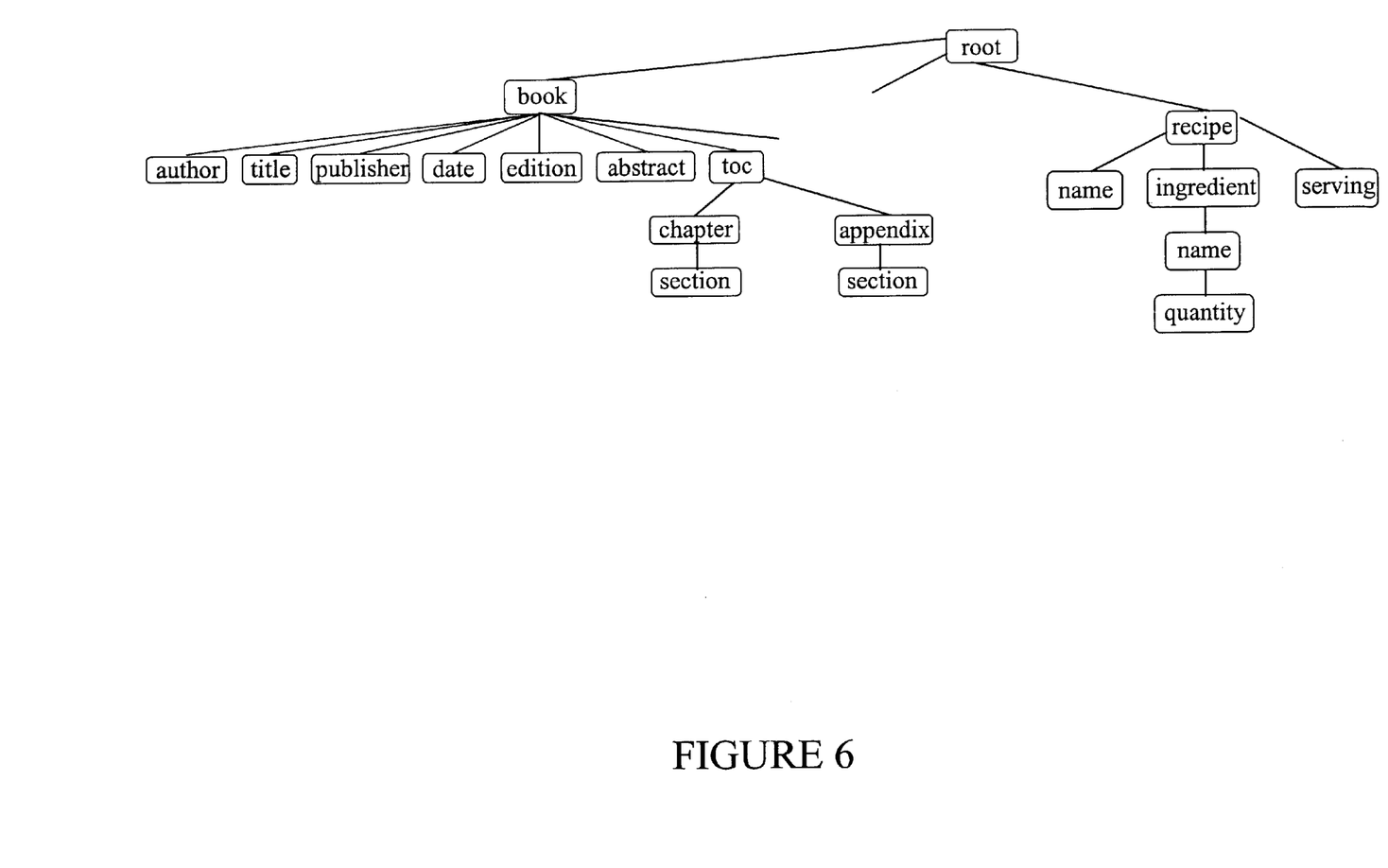
FIG. 6 illustrates an index created using a document abstraction labeled D2 in FIG. 4.

FIG. 5 illustrates an example of a structured index designed using the abstraction labeled $D_6$ in FIG. 4, where the <book> node is the abstraction of the XML document shown in FIG. 2, and the <recipe> and <journal> nodes are abstractions of other XML documents. Similar to a content-search index, where each word is associated with a list of references of occurrence of the word in documents, in the example shown in FIG. 5, each of the nodes in the structured index is associated with a list of references indicating the occurrences of that particular structure in XML documents. Referring to the index in FIG. 5, the reference list at the node <book> consists of all documents that have the element with the <book> tag as the top element. FIG. 6 shows an example of an index designed using the abstraction labeled $D_2$ in FIG. 4. In this example, the reference list at the node <section>, along the path "<book>.<toc>.<chapter>.<section>" consists of all elements with the <section> tag along the same path in all XML documents. Some documents may not have the exact <book> structure shown. Therefore, referring back to the index in FIG. 6, <book> may have other elements, or <author> may have elements as shown.

Figure 7:
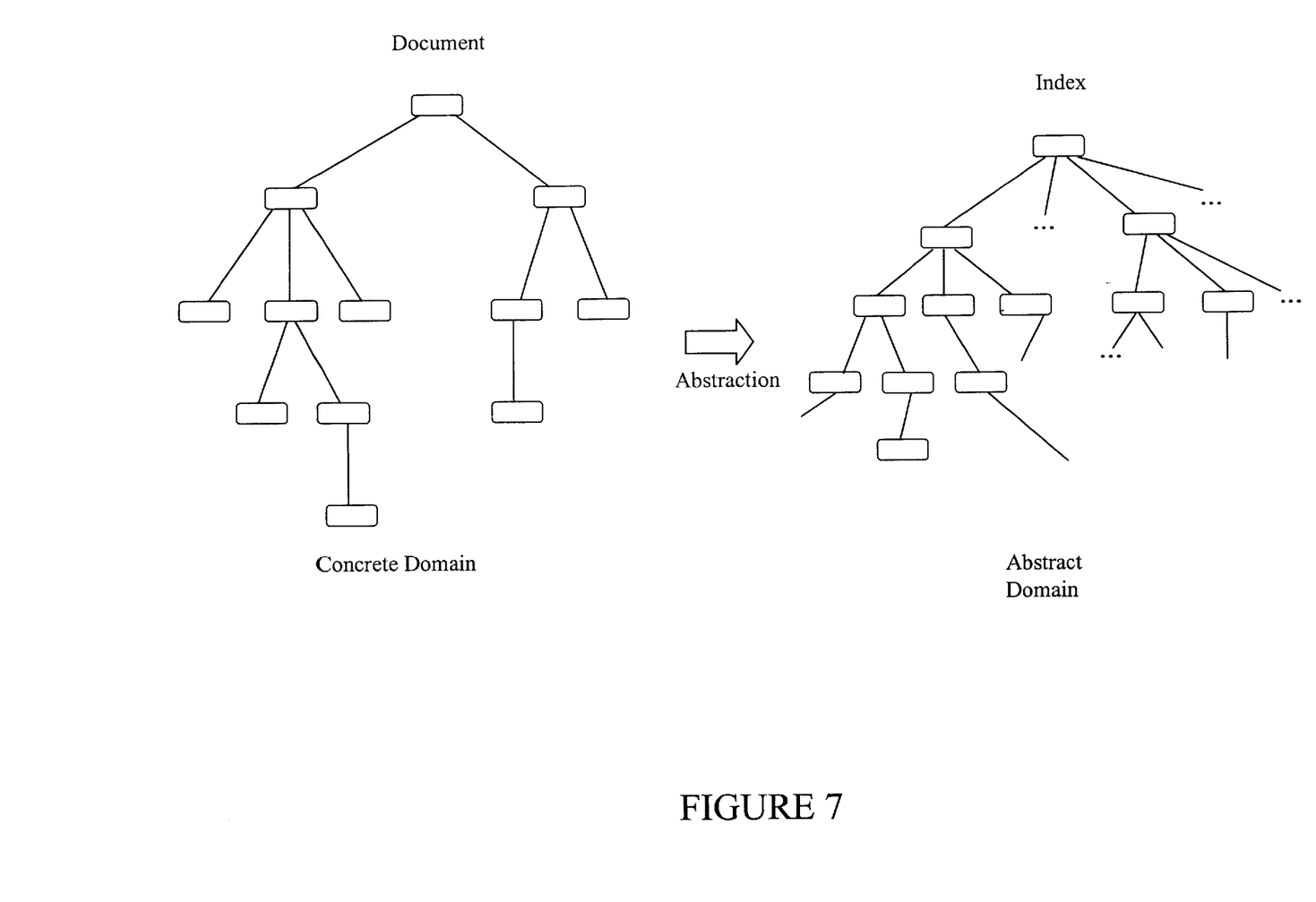
FIG. 7 illustrates an abstraction procedure of a structured document.

As previously mentioned, each document structure (denoted by its root element) can be thought of as a tree, and each element can also be thought of as a tree rooted at the element. As illustrated in FIG. 7, a concrete domain D comprises a plurality of structure trees representing structured documents. Referring to FIG. 7, an abstraction A maps a tree in the concrete domain D into a tree in the index I, referred to as an abstract domain. Underlines are used for denoting objects in the abstract domain. Examples of abstractions for an element e of a structured document are shown below:

identity(e): maps e with itself.

leaf(e): maps e with its subtree to a leaf node by removing all nested elements within e. This is also called down-conversion.

unique(e): collapses e's elements with the same tag name into a single element.

merge(e, {$tag_1, tag_2, \ldots, tag_n$}): merges e's elements matching one of the listed tags into a new element with a new tag.

remove(e, {$tag_1, tag_2, \ldots, tag_n$}): removes e's elements matching one of the listed tags.

Referring back to FIG. 4, in the abstraction labeled $D_4$ above, the element with the <toc> tag in D, with its subtree, is mapped into a leaf element with the same <toc> tag in the abstract domain. In the abstraction labeled $D_5$, the abstraction remove(<book>, {<date>,<edition>}) is applied at the <book> level and removes the elements with the <date> and <edition> tags.

If $d_1$ and $d_2$ are two structured documents or trees, and "$\leq$" is the partial order between $d_1$ and $d_2$, $d_1 \leq d_2$ if and only if for every node n reached by path p in $d_1$, there is a node m reached by path p in $d_2$, such that the nested nodes of n are fewer in number than the nested nodes of m. Referring to FIG. 4 and considering the document trees resulting from the six abstractions, a partial order $D_6 \leq D_5 \leq D_4 \leq \{D_3, D_2\} \leq D_1$ results. $D_3$ and $D_2$ are not related by partial order, because the "unique" and "merge" abstraction functions combine nested nodes of merged nodes, which in general alter the resulting structures.

If d is a structured document and considering the abstraction functions "leaf" and "remove" defined above, leaf(d)$\leq$d and remove(d)$\leq$d because both abstraction functions remove structure from the structured document d.

If $d_1$ and $d_2$ are two structured trees, and $d_1 \leq d_2$, meaning that for every node $n_1$ in $d_1$, there is a corresponding node $n_2$ in $d_2$, where $n_2$ has at least those nested nodes that $n_1$ has, applying any of the abstraction functions "leaf," "unique," and "remove" on $n_1$ and $n_2$, will not make $n_1$ more structured than $n_2$. Therefore, abstraction functions "leaf," "unique," and "remove" are all monotonic functions.

If $d_1$ and $d_2$ are two document trees, and $d_1 \leq d_2$, meaning that for every node $n_1$ in $d_1$, there is a corresponding node $n_2$ in $d_2$, where $n_2$ has at least those nested nodes that $n_1$ has, applying the "merge" abstraction function on $n_1$ and $n_2$ will merge {$tag_i$} into a node $x_1$ and $x_2$, respectively, with the same tag x. Because the nodes corresponding to the merged tags are less structured in the $x_1$ case than those in the $x_2$ case, $x_1 \leq x_2$, and thus the abstraction function "merge" is also monotonic when the same new tag is assigned.

In general, a path expression p can be specified in place of the element e, as the argument to the above abstraction functions to indicate that the function is applied to any element qualified by the path expression p. If the path expression p resides in the concrete domain D, and the searching is done in the structured index I, also called the abstract domain, there is a need to define an abstract version of the path p, labeled p. Some abstractions preserve paths, such that p can be directly used to search in the abstract domain. In general, an abstraction map A preserves paths if p=p for any path expression p.

Referring to the abstraction functions defined above, "identity" and "unique" are path-preserving abstractions. The abstraction "merge" can also be considered path-preserving, if merged elements in p receive new tags. However, the number of path-preserving abstractions is low. Some abstractions remove tags, and thus do not preserve paths when p contains tags that have been removed.

Generally, if p=$e_0 \ldots e_n$ is a path expression from a root, where $e_0$ is the root, the abstract path of p can be obtained by applying the abstraction maps on the nodes along the path p. For example, if p is <book>.<toc>.<chapter>.<section>, then the abstraction of p in each of the previous document abstractions $D_1, \ldots D_6$, shown in FIG. 4, is respectively:

1. <book>.<toc>.<chapter>.<section>
2. <book>.<toc>.<chapter>.<section>
3. <book>.<toc>.<chap-app>.<section>
4. <book>.<toc>
5. <book>.<toc>
6. <book>

Because a path expression p represents in general a set of paths from a root, the abstract path of p, labeled p, may not be a path, but a collection of paths. For example, if p=$e_0, \ldots e_n$, where $e_0$ is the root, and q={wp|w is a path from root to $e_0$} is the set of paths from root that satisfy the path expression p, then the abstract path of p is the set of abstract paths obtained by abstracting each path in q. Unfortunately, there is no mechanism in the abstract domain to know q, and in fact, there is no easy way to represent the abstract path in a compact form. Instead, an algorithm will be described to compute the abstract path p. This algorithm is illustrated in FIG. 8.

Figure 8:
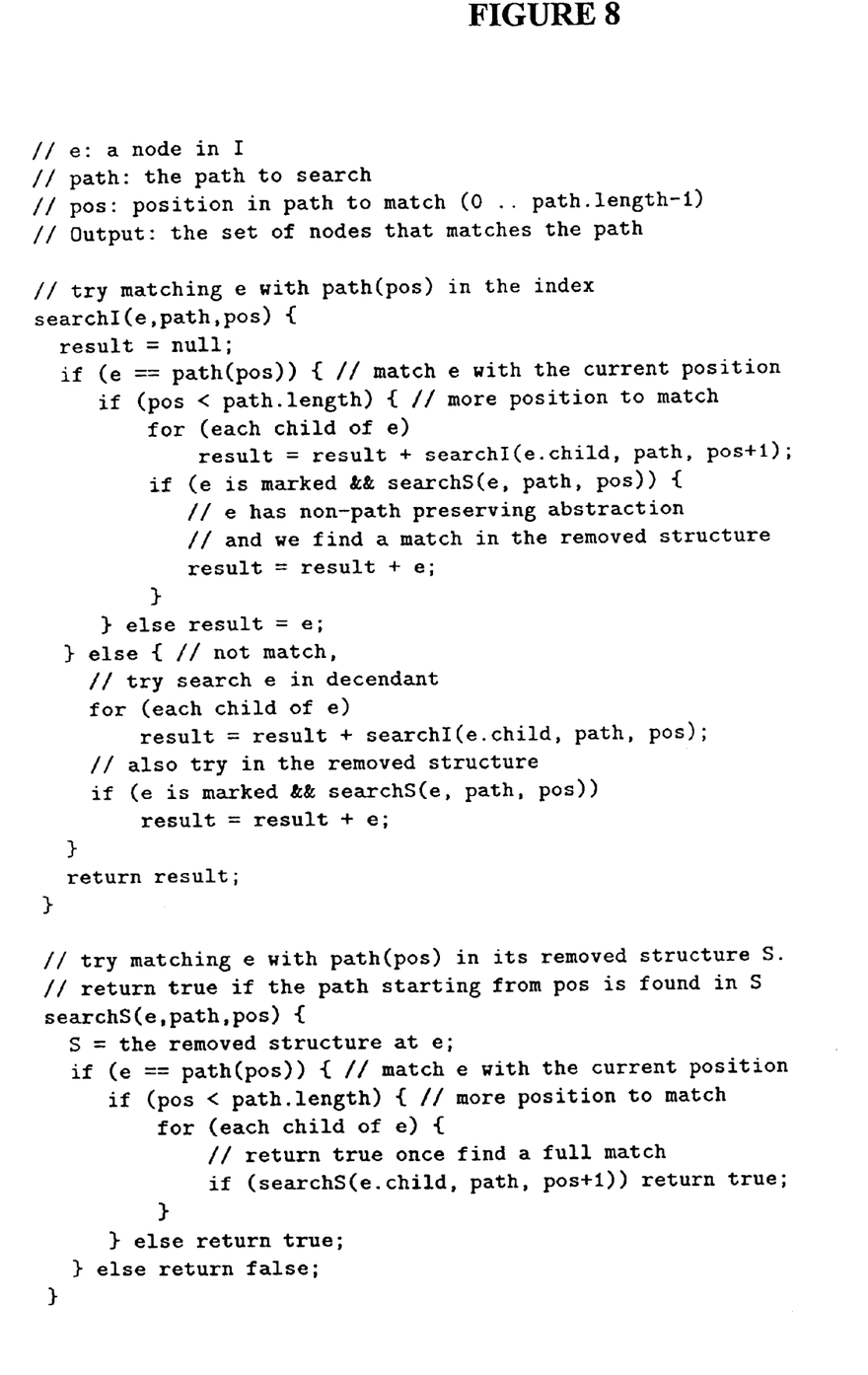
FIG. 8 illustrates an algorithm for searching a path in an abstract domain.

Referring to FIG. 8, the algorithm "searchI" searches for the path p in the structured index I. Every structure S that has been removed by a non path-preserving abstraction applied to an element e must be remembered. All elements belonging to structure S must be specially marked in the index I. The structure S simply records the structure that has been removed; S does not have a list of references associated with each node in it. At a marked node e within the removed structure S, the algorithm uses "searchS" to search for matches in S, and when a match is found, node e is included to the results of "searchI." Using the structured document of FIG. 3 and the abstraction $D_4$ illustrated in FIG. 4 as an example, if the path expression p is <chapter>.<section>, then the algorithm "searchI" will return <toc> as a result. Generally, if p=$e_0, \ldots, e_n$ is a path, and q={$w_1, \ldots, w_k$} is the set of paths, starting from the root $e_0$, that satisfy p, and if p={$w_i, \ldots, w_k$} is the abstract path of p, and N the set of end nodes in those paths, then search ($e_0$, p, 0) returns N.

Abstractions can also be applied to pure text contents, as well as to attributes. There are many ways to abstract the content and the attribute parts of structured documents, depending on desired cost and capability tradeoff. Application-specific knowledge often provides good directions for abstractions. Contents and attribute values are normally basic data types, such as character strings or numeric values. Examples of abstractions of a content c of a character string type include:

nullify(c): removes the content c.

keyword(c): extracts only the application-defined keywords. For example, a content-search index usually does not index stop-words.

initial(c): extracts only the initials. For example, this abstraction may be used for abstracting names (people, company, etc.).

Examples of abstractions of a content c of a numeric value v type, but not necessarily limited to this data type, include:

sign(v): denotes negative, zero, positive numbers.

magnitude(v): tens, hundreds, kilo, mega, giga, etc.

temperature(v): freezing, cold, cool, warm, hot, etc.

price(v): cheap, reasonable, expensive, etc.

age_group(v): senior, adult, youth, etc.

score(v): maps a score to grade 'A', 'B', 'C', etc.

As an illustration of the above-mentioned abstractions, an application about ticket sales may apply the "age_group" abstraction (which reduces an integer domain to a domain with only three values) to XML documents received from some other application.

Considering $d_1$ and $d_2$ two values in a domain D, $d_1 \leq d_2$ if and only if $d_1=d_2$ or $d_1=\perp$ (empty). In this case, the domain D is known as a flat domain. Unless extra semantics are added, basic data types are flat domains. For instance, if a document is simply seen as a character string, it is a flat domain. If extra semantics are added by constructing its structure, then it can become a non-flat domain. When dealing with numbers, the partial ordering relation should not be confused with the usual value comparison relation. For example, an age of 10 and an age of 20 have the same amount of information. They are not related by the partial order, unless extra semantics are added. Because basic data types are flat domains, all of the above-mentioned abstractions are trivially monotonic.

Figure 9:
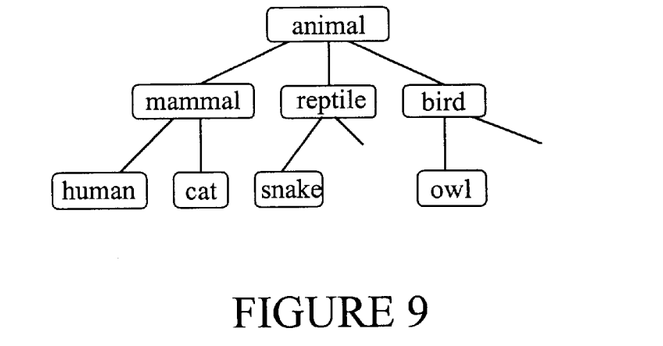
FIG. 9 illustrates an example of a hierarchy having animal as a root.
Figure 10:
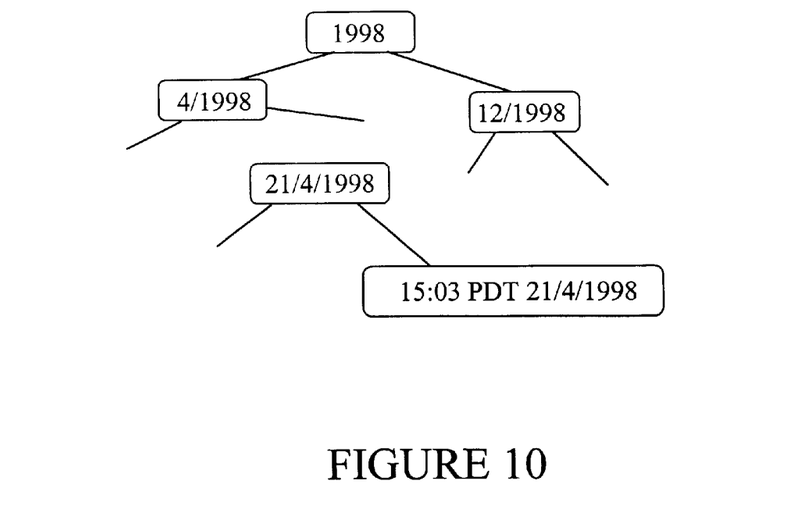
FIG. 10 illustrates an example of a hierarchy based on different time values, having 1998 as a root.

A general data type can be a domain that has a hierarchy built on partial ordering among values. Document structures and their associated partial order are such an example. A monotonic function can be created to map values in a flat domain into values in a non-flat domain, with added semantics. Referring to FIG. 9, a category function can map a character string to a value in an animal hierarchy, if extra knowledge exists about the character string. In FIG. 9, "belongs-to" is the partial order. For example, an owl belongs to the bird category and a bird belongs to the animal category. FIG. 10 illustrates a hierarchy of 'time' data field, where preciseness is the partial ordering. In FIG. 10, 15:03 PDT 21/4/1998 is a more precise time within the 21/4/1998 category, which is a more precise time in the 4/1998 category, which is part of the 1998 category. In the 'time' domain of FIG. 10, the original source may be just a string value, and a time value can be in various formats (e.g., "15:03 PDT 21/4/1998", or "Apr. 4, 1998"), but an abstraction map can be defined to standardize the time and to map it to an appropriate value in the abstract domain hierarchy.

A domain T for an attribute list of name=value pairs is a product of a domain N for names and a domain V for values, i.e., T=N×V. The following are examples of abstractions resulting in an abstract domain T:

T→N×V where N and V are abstract domains for N and V, respectively.

T→N. Drops the V component.

T→V. Drops the N component.

⊥. Drops the whole list.

An implementation of the present invention will now be described in further detail. Referring back to FIG. 1, an operator sitting at a monitor 118 interactively enters into the computer system 102 a request for creation or update of a structured index via operator interface 106. The Database Services module 108 retrieves or receives the request for further processing. The SQL compiler/interpreter within the other components 116 creates the code to be transmitted to the Relational Data Service (RDS) 110, translating the request to create or update the structured index. The RDS 110 interprets the code it receives from the SQL compiler/interpreter within the other components 116 and provides the interpreted code along with the location of an abstraction procedure entered by the operator to an Index Manager (not shown) residing within the Data Manager 112. The Index Manager is responsible for creating and updating the structured index using the method described in the present invention. Relying on the predefined abstraction procedure specified by the operator, the Index Manager parses a structured document, interactively entered by the operator or stored in the data storage devices 104, abstracts the parsed document using the abstraction procedure to obtain a set of abstracted values, and stores the set of abstracted values in the structured index.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize that many modifications may be made to this configuration without departing from the scope of the present invention.

In summary, the present invention discloses a method, apparatus, and article of manufacture for a computer-implemented creation of an index in a database system for efficient execution of structured queries.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of creating an index in a database system for execution of a structured query given by a user, comprising the steps of:

providing a structured document, having at least one element;

defining an abstraction procedure for said structured document;

parsing said structured document into said at least one element;

abstracting said at least one element using said abstraction procedure to obtain a set of abstract values; and storing said set of abstract values in said index for execution of said structured query in said database system.

2. The method of claim 1, wherein said at least one element of said structured document is identified by tags defined by said user.

3. The method of claim 2, wherein in said abstracting step, said abstraction procedure is structured on at least one level, said at least one level including each of said at least one element having identical tags.

4. The method of claim 3, wherein said step of defining said abstraction procedure comprises mapping said structured document into itself.

5. The method of claim 3, wherein said step of defining said abstraction procedure comprises merging each of said at least one element having identical tags.

6. The method of claim 3, wherein said step of defining said abstraction procedure comprises merging said at least one element included in said at least one level into a new merged element having a new tag.

7. The method of claim 3, wherein said structured document comprises a plurality of elements and wherein said step of defining said abstraction procedure comprises removing, from said structured document, each of said plurality of elements having no importance to said structured query.

8. The method of claim 3, wherein said step of defining said abstraction procedure comprises collapsing said structured document into a unique element.

9. The method of claim 3, wherein said abstraction procedure is structured on a plurality of levels including a lower level and an upper level, said structured document comprises a plurality of elements, and said step of defining said abstraction procedure comprises collapsing each of said plurality of elements included in said lower level into one of said plurality of elements included in said upper level.

10. The method of claim 1, wherein said structured document having said at least one element resides in a concrete domain in said database system, and wherein said concrete domain comprises a plurality of structured documents within said database system.

11. The method of claim 1, wherein said set of abstracted values and said index reside in an abstract domain in said database system, and wherein said abstract domain comprises abstractions of a plurality of structured documents within said database system.

12. The method of claim 1, wherein in said defining step, said abstraction procedure is defined to further abstract a path expression given by said user in said structured query.

13. The method of claim 12, wherein in said defining step, said abstraction procedure comprises preserving said path expression of said structured query.

14. The method of claim 12, wherein in said defining step, said abstraction procedure comprises not preserving said path expression of said structured query.

15. The method of claim 2, wherein said at least one element of said structured document further comprises content, and wherein said content includes text within said tags defined by said user.

16. The method of claim 15, wherein said content of said at least one element of said structured document is a character string.

17. The method of claim 15, wherein said content of said at least one element of said structured document is a numeric value.

18. The method of claim 15, wherein said step of abstracting said at least one element of said structured document further includes abstracting said content of said at least one element.

19. The method of claim 2, wherein said at least one element of said structured document further comprises at least one attribute, and wherein said at least one attribute includes a plurality of corresponding names and values associated with said at least one element of said structured document.

20. The method of claim 19, wherein said step of abstracting said at least one element of said structured document further includes abstracting said at least one attribute of said at least one element.

21. The method of claim 19, wherein said at least one attribute of said at least one element of said structured document is a character string.

22. The method of claim 19, wherein said at least one attribute of said at least one element of said structured document is a numeric value.

23. An apparatus for creating an index in a database system for executing a structured query given by a user, said apparatus comprising:

a computer having at least one data storage device connected thereto, wherein said at least one data storage device stores said index and said database system; and at least one computer program performed by said computer for providing a structured document, having at least one element;

defining an abstraction procedure for said structured document;

parsing said structured document into said at least one element;

abstracting said at least one element using said abstraction procedure to obtain a set of abstract values;

storing said set of abstract values in said index for execution of said structured query in said database system.

24. The apparatus of claim 23, wherein said at least one element of said structured document is identified by tags defined by said user.

25. The apparatus of claim 24, wherein said abstraction procedure is structured on at least one level, said at least one level including each of said at least one element having identical tags.

26. The apparatus of claim 25, wherein said at least one computer program, during defining, further maps said structured document into itself.

27. The apparatus of claim 25, wherein said at least one computer program, during defining, further merges each of said at least one element having identical tags.

28. The apparatus of claim 25, wherein said at least one computer program, during defining, further merges said at least one element included in said at least one level into a new merged element having a new tag.

29. The apparatus of claim 25, wherein said structured document comprises a plurality of elements and wherein said at least one computer program, during defining, further removes each of said plurality of elements having no importance to said structured query from said structured document.

30. The apparatus of claim 25, wherein said at least one computer program, during defining, further collapses said structured document into a unique element.

31. The apparatus of claim 25, wherein said abstraction procedure is structured on a plurality of levels including a lower level and an upper level, said structured document comprises a plurality of elements, and said at least one computer program, during defining, further collapses each of said plurality of elements included in said lower level into one of said plurality of elements included in said upper level.

32. The apparatus of claim 23, wherein said structured document having said at least one element resides in a concrete domain in said database system, and wherein said concrete domain comprises a plurality of structured documents within said database system.

33. The apparatus of claim 23, wherein said set of abstracted values and said index reside in an abstract domain in said database system, and wherein said abstract domain comprises abstractions of a plurality of structured documents within said database system.

34. The apparatus of claim 23, wherein said at least one computer program, during defining, defines said abstraction procedure to further abstract a path expression given by said user in said structured query.

35. The apparatus of claim 34, wherein said at least one computer program, during defining, further defines said abstraction procedure to preserve said path expression of said structured query.

36. The apparatus of claim 34, wherein said at least one computer program, during defining, further defines said abstraction procedure not to preserve said path expression of said structured query.

37. The apparatus of claim 24, wherein said at least one element of said structured document further comprises content, and wherein said content includes text within said tags defined by said user.

38. The apparatus of claim 37, wherein said content of said at least one element of said structured document is a character string.

39. The apparatus of claim 37, wherein said content of said at least one element of said structured document is a numeric value.

40. The apparatus of claim 37, wherein said at least one computer program, during abstracting, further abstracts said content of said at least one element.

41. The apparatus of claim 24, wherein said at least one element of said structured document further comprises at least one attribute, and wherein said at least one attribute includes a plurality of corresponding names and values associated with said at least one element of said structured document.

42. The apparatus of claim 41, wherein said at least one computer program, during abstracting, further abstracts said at least one attribute of said at least one element.

43. The apparatus of claim 41, wherein said at least one attribute of said at least one element of said structured document is a character string.

44. The apparatus of claim 41, wherein said at least one attribute of said at least one element of said structured document is a numeric value.

45. An article of manufacture comprising a program storage device readable by a computer and tangibly embodying at least one program of instructions executable by said computer to perform method steps for creating an index in a database system, said computer having at least one data storage device coupled thereto for storing said index and said database system, the method comprising the steps of:

providing a structured document, having at least one element;

defining an abstraction procedure for said structured document;

parsing said structured document into said at least one element;

abstracting said at least one element using said abstraction procedure to obtain a set of abstract values; and storing said set of abstract values in said index for execution of said structured query in said database system.

46. The article of manufacture of claim 45, wherein said at least one element of said structured document is identified by tags defined by said user.

47. The article of manufacture of claim 46, wherein in said abstracting step, said abstraction procedure is structured on at least one level, said at least one level including each of said at least one element having identical tags.

48. The article of manufacture of claim 47, wherein said step of defining said abstraction procedure comprises mapping said structured document into itself.

49. The article of manufacture of claim 47, wherein said step of defining said abstraction procedure comprises merging each of said at least one element having identical tags.

50. The article of manufacture of claim 47, wherein said step of defining said abstraction procedure comprises merging said at least one element included in said at least one level into a new merged element having a new tag.

51. The article of manufacture of claim 47, wherein said structured document comprises a plurality of elements and said step of defining said abstraction procedure comprises removing each of said plurality of elements having no importance to said structured query from said structured document.

52. The article of manufacture of claim 47, wherein said step of defining said abstraction procedure comprises collapsing said structured document into a unique element.

53. The article of manufacture of claim 47, wherein said abstraction procedure is structured on a plurality of levels including a lower level and an upper level, said structured document comprises a plurality of elements, and said step of defining said abstraction procedure comprises collapsing each of said plurality of elements included in said lower level into one of said plurality of elements included in said upper level.

54. The article of manufacture of claim 45, wherein said structured document having said at least one element resides in a concrete domain in said database system, and wherein said concrete domain comprises a plurality of structured documents within said database system.

55. The article of manufacture of claim 45, wherein said set of abstracted values and said index reside in an abstract domain in said database system, and wherein said abstract domain comprises abstractions of a plurality of structured documents within said database system.

56. The article of manufacture of claim 45, wherein in said defining step, said abstraction procedure is defined to further abstract a path expression given by said user in said structured query.

57. The article of manufacture of claim 56, wherein in said defining step, said abstraction procedure comprises preserving said path expression of said structured query.

58. The article of manufacture of claim 56, wherein in said defining step, said abstraction procedure comprises not preserving said path expression of said structured query.

59. The article of manufacture of claim 46, wherein said at least one element of said structured document further comprises content, and wherein said content includes text within said tags defined by said user.

60. The article of manufacture of claim 59, wherein said content of said at least one element of said structured document is a character string.

61. The article of manufacture of claim 59, wherein said content of said at least one element of said structured document is a numeric value.

62. The article of manufacture of claim 59, wherein said step of abstracting said at least one element of said structured document further includes abstracting said content of said at least one element.

63. The article of manufacture of claim 46, wherein said at least one element of said structured document further comprises at least one attribute, and wherein said at least one attribute includes a plurality of corresponding names and values associated with said at least one element of said structured document.

64. The article of manufacture of claim 63, wherein said step of abstracting said at least one element of said structured document further includes abstracting said at least one attribute of said at least one element.

65. The article of manufacture of claim 63, wherein said at least one attribute of said at least one element of said structured document is a character string.

66. The article of manufacture of claim 63, wherein said at least one attribute of said at least one element of said structured document is a numeric value.

* * * * *